United States Patent
Halem et al.

(10) Patent No.: US 10,796,351 B2
(45) Date of Patent: Oct. 6, 2020

(54) IN-VEHICLE CONSUMER PURCHASE SYSTEM

(71) Applicant: Continental Intelligent Transportation Systems, LLC, Santa Clara, CA (US)

(72) Inventors: Michael A. Halem, New York, NY (US); Seval Oz, San Jose, CA (US)

(73) Assignee: Continental Intelligent Transportation Systems, LLC, Santa Clara, CA (US)

(*) Notice: Subject to any disclaimer, the term of this patent is extended or adjusted under 35 U.S.C. 154(b) by 232 days.

(21) Appl. No.: 15/753,515

(22) PCT Filed: Aug. 19, 2016

(86) PCT No.: PCT/US2016/047860
§ 371 (c)(1),
(2) Date: Feb. 19, 2018

(87) PCT Pub. No.: WO2017/035011
PCT Pub. Date: Mar. 2, 2017

(65) Prior Publication Data
US 2018/0232788 A1    Aug. 16, 2018

Related U.S. Application Data

(60) Provisional application No. 62/209,110, filed on Aug. 24, 2015.

(51) Int. Cl.
*G06Q 30/06* (2012.01)
*G06F 16/29* (2019.01)
*H04W 4/44* (2018.01)
*G06Q 20/24* (2012.01)
*G07C 5/00* (2006.01)
*H04L 29/08* (2006.01)

(52) U.S. Cl.
CPC ......... *G06Q 30/0601* (2013.01); *G06F 16/29* (2019.01); *G06Q 20/24* (2013.01); *G06Q 30/06* (2013.01); *G07C 5/00* (2013.01); *H04L 67/12* (2013.01); *H04W 4/44* (2018.02)

(58) Field of Classification Search
None
See application file for complete search history.

(56) References Cited

U.S. PATENT DOCUMENTS

| | | | |
|---|---|---|---|
| 6,526,335 B1 | 2/2003 | Treyz et al. | |
| 6,542,758 B1 | 4/2003 | Chennakeshu et al. | |
| 8,634,826 B1 | 1/2014 | Cope et al. | |
| 8,676,135 B2 * | 3/2014 | Hong | H04N 21/8113 455/345 |

(Continued)

FOREIGN PATENT DOCUMENTS

| | | |
|---|---|---|
| CN | 104424558 A | 3/2015 |
| WO | 2015/044791 A2 | 4/2015 |

OTHER PUBLICATIONS

Gilroy, A., "More 'Live' Internet/Video for Cars at SEMA," TWICE 23.24: 36. Future Publishing, Ltd., Nov. 17, 2008. (Year: 2008).*

(Continued)

*Primary Examiner* — Nicholas D Rosen

(57) ABSTRACT

A method, apparatus, and system for a cloud based in-vehicle consumer purchase is discussed.

10 Claims, 8 Drawing Sheets

(56) References Cited

U.S. PATENT DOCUMENTS

| | | | |
|---|---|---|---|
| 8,948,727 B2* | 2/2015 | Tang | H04W 12/08 |
| | | | 455/411 |
| 9,047,602 B2* | 6/2015 | Alrabady | G06Q 20/3224 |
| 2002/0113690 A1 | 8/2002 | Becker et al. | |
| 2005/0102074 A1 | 5/2005 | Kolls | |
| 2005/0176369 A1 | 8/2005 | Holmes et al. | |
| 2006/0031550 A1* | 2/2006 | Janik | G06F 1/1632 |
| | | | 709/231 |
| 2009/0024525 A1* | 1/2009 | Blumer | G06Q 20/10 |
| | | | 705/41 |
| 2009/0187489 A1 | 7/2009 | Mallick et al. | |
| 2010/0049626 A1* | 2/2010 | Hong | G06Q 30/06 |
| | | | 705/26.1 |
| 2011/0275358 A1 | 11/2011 | Faenger | |
| 2011/0294466 A1* | 12/2011 | Tang | H04W 12/08 |
| | | | 455/411 |
| 2011/0313593 A1 | 12/2011 | Cohen et al. | |
| 2013/0124006 A1 | 5/2013 | Anantha et al. | |
| 2013/0185152 A1 | 7/2013 | Aaron et al. | |
| 2013/0290141 A1 | 10/2013 | Bhaskar et al. | |
| 2013/0329888 A1* | 12/2013 | Alrabady | G06Q 20/3224 |
| | | | 380/270 |
| 2014/0089095 A1* | 3/2014 | Bennett | G06Q 30/0261 |
| | | | 705/14.64 |
| 2014/0100976 A1 | 4/2014 | Aldomar et al. | |
| 2014/0269649 A1 | 9/2014 | Lockerbie | |
| 2015/0039365 A1 | 2/2015 | Haque | |
| 2015/0131512 A1 | 5/2015 | Lauer et al. | |
| 2015/0142612 A1* | 5/2015 | Hanna | G06Q 20/085 |
| | | | 705/26.81 |
| 2015/0170116 A1* | 6/2015 | Amtmann | G06Q 20/204 |
| | | | 705/41 |
| 2015/0220916 A1 | 8/2015 | Prakash et al. | |
| 2015/0223059 A1* | 8/2015 | Canpolat | H04W 48/18 |
| | | | 726/7 |

OTHER PUBLICATIONS

International Search Report and Written Opinion dated Dec. 29, 2016 from corresponding International Patent Application No. PCT/US2016/047860.

Search Report dated Feb. 17, 2016 from corresponding GB Patent Application No. 1516258.9.

* cited by examiner

Intelligent Transportation Systems

IN-VEHICLE CONSUMER PURCHASE SYSTEM

FIELD

Embodiments generally relate to in-vehicle consumer purchase.

More particularly, an aspect of an embodiment relates to selecting and purchasing products and service while riding in a vehicle.

BACKGROUND

Typically, online consumer purchases are made on the Internet websites through a mobile or desktop device of the consumer. This technology instead, via a module in the vehicle, offers the passengers of the vehicle products and services to be purchased.

SUMMARY

In general, a cloud based system for consumer purchase while riding in a vehicle to a destination includes one or more cloud based servers. The servers have a first group of one or more processors and one or more ports. The servers are configured to cooperate with one or more databases in the cloud based system. The vehicle has an on-board intelligent plugin adapter that includes one or more memory buffers, and a second group of one or more processors. The on-board intelligent plugin adapter of the vehicle also includes a first transceiver configured to use wireless communications to communicate with one or both of i) a first client device of a consumer in the vehicle, and ii) a second client device installed inside the vehicle. The on-board intelligent plugin adapter of the vehicle further includes a second transceiver configured to use wireless communications to communicate with the cloud based servers of the cloud based system. A control module running on one of the processors of the cloud based system is configured to communicate through one of the ports of the cloud based system to the second transceiver and then through the first transceiver, to one or both of i) the first client device of the consumer in the vehicle, and ii) the second client device inside the vehicle. Then the control module transmits data for Internet browsing, downloading mobile applications, video streaming, interactive games, commercials advertisements both interactive and non-interactive and displaying interactive menus for selection from one or more merchant sites, to be displayed on one or both of the first client device and the second client device. The customer can choose and purchase or optionally receive gratis, zero or more items based on the offered products or services on the first client device and the second client device.

In an embodiment, the first transceiver may be hard wired via a bus, such as ethernet, to the second transceiver, such that the transmitter and receiver communicating between each of the second and first transceiver may be electrically connected to communicate over conductive cable or over fiber-optic cable.

In all the discussions below, in an embodiment, it may be that computer functions such as the display may be incorporated into a single device, such that there is no need for a first transceiver if the second transceiver is located within the display and keyboard device, such as a computer, cellphone, tablet, or personal digital assistant.

In an embodiment, a method for alternative in-vehicle consumer purchase includes a number of example steps. The user, while riding a vehicle to a final destination, is offered, via the interactive commercials or menus, to watch, play, or listen to one or more items including movies, interactive games, news, and commercials. The user can watch, play, or listen via one or both of i) a first client device of the user riding the vehicle, and ii) a second client device installed inside the vehicle. The interactive commercials or menus can be configured to offer to the user one or more products and services for purchase, lease, or rental. The user can select and purchase one or more of the offered products and services on the first client device or the second client device. The selected products and services are processed. The vehicle can stop and pick up the purchased products or receive the purchased services at one or more intermediate destination before reaching the final destination. Alternatively another vehicle, mail or delivery service whether physical or electronic may deliver the products or services to a destination of the purchaser's choice. In yet another alternative, the product when consisting of media or games may be consumed in the vehicle during the ride and optionally continued subsequently at a destination of the purchaser's choice.

BRIEF DESCRIPTION OF THE DRAWINGS

The multiple drawings refer to the example embodiments of the design.

FIGS. 6-7 illustrate user interfaces of an application of an in-vehicle consumer purchase service on a user client device used for signing up and logging in.

Figure 1:
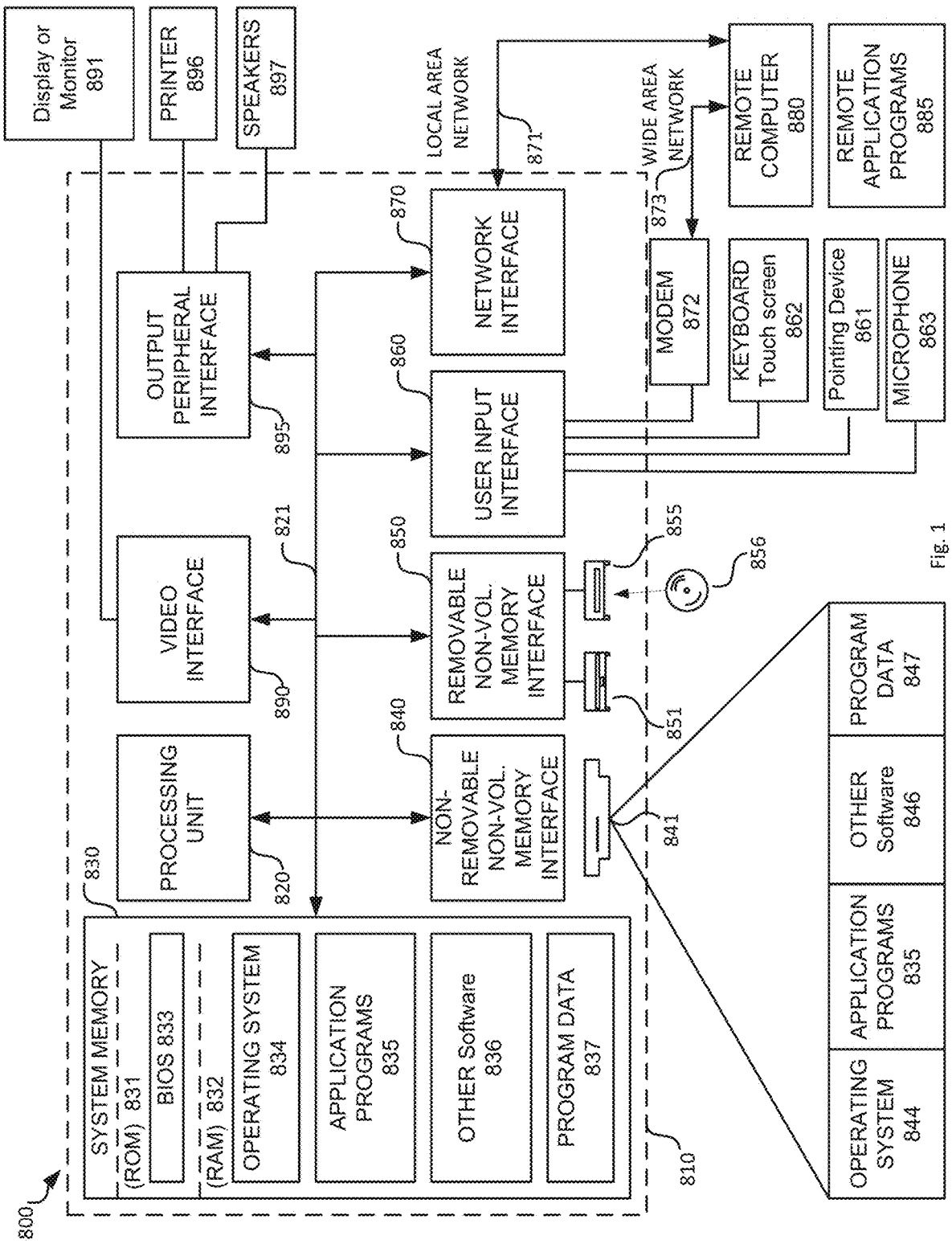
FIG. 1 illustrates a block diagram of an example computing system that can be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific data signals, named components, connections, number of memory columns in a group of memory columns, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further specific numeric references such as first driver, may be made. However, the specific numeric reference should not be interpreted as a literal sequential order but rather interpreted that the first driver is different than a second driver. Thus, the specific details set forth are merely exemplary. The specific details may be varied from and still be contemplated to be within the spirit and scope of the present design. The term coupled is defined as meaning connected either directly to the component or indirectly to the component through another component.

In general, an in-vehicle consumer purchase service can be hosted on a cloud based system and allows consumer purchases while riding in a vehicle. The system includes one or more cloud based servers that include a first group of one or more processors and one or more ports. The cloud based servers can cooperate with one or more databases in the cloud based system. The cloud based system can provide the ability for a passenger of the vehicle to make some purchases of goods and services that are offered through an intelligent plugin adapter (e.g., a dongle) in the vehicle. The intelligent plugin adapter can include one or more memory buffers and a second group of one or more processors. There can be two client devices inside the vehicle. The first client device is a client device (e.g., a cell phone) of the user/passenger of the vehicle. The second client device can be a display (e.g., a touch screen) installed in the vehicle. Thus, even when the passengers do not have or do not turn on their mobile devices, they can still log in to the second client device installed in the vehicle and communicate through the second client device. The intelligent plugin adapter has a second transceiver that can use cellular communication protocols and communicate to the cloud based servers of the system and also has a first transceiver that can use Wi-Fi, Bluetooth, Optical or Infrared protocols and communicate with the first and second client devices in the vehicle. A control module running on one the first group of the processors of the cloud based servers is configured to communicate through one of the ports of the cloud based system to the second transceiver of the on-board intelligent plugin adapter and then communicate, through the first transceiver, to one or both of i) the first client device of the consumer in the vehicle, and ii) the second client device inside the vehicle. Thus, using both the first and second transceivers, the control module running on a cloud based server can communicate with the first and/or the second client device inside the vehicle. Through the first and second transceivers, the control module on the cloud based server can display on one or both client devices movies, news, interactive games, commercials, menus, etc. Additionally, through the first and second transceivers, the control module on the cloud based server can receive the selections and orders that the user enters into the client devices. The commercials can be made interactive such that the user can select an item displayed in a commercial and purchase it. Additionally, the control module on the cloud based server can direct the vehicle to intermediate destinations to pick up the purchased items.

Figure 2A:
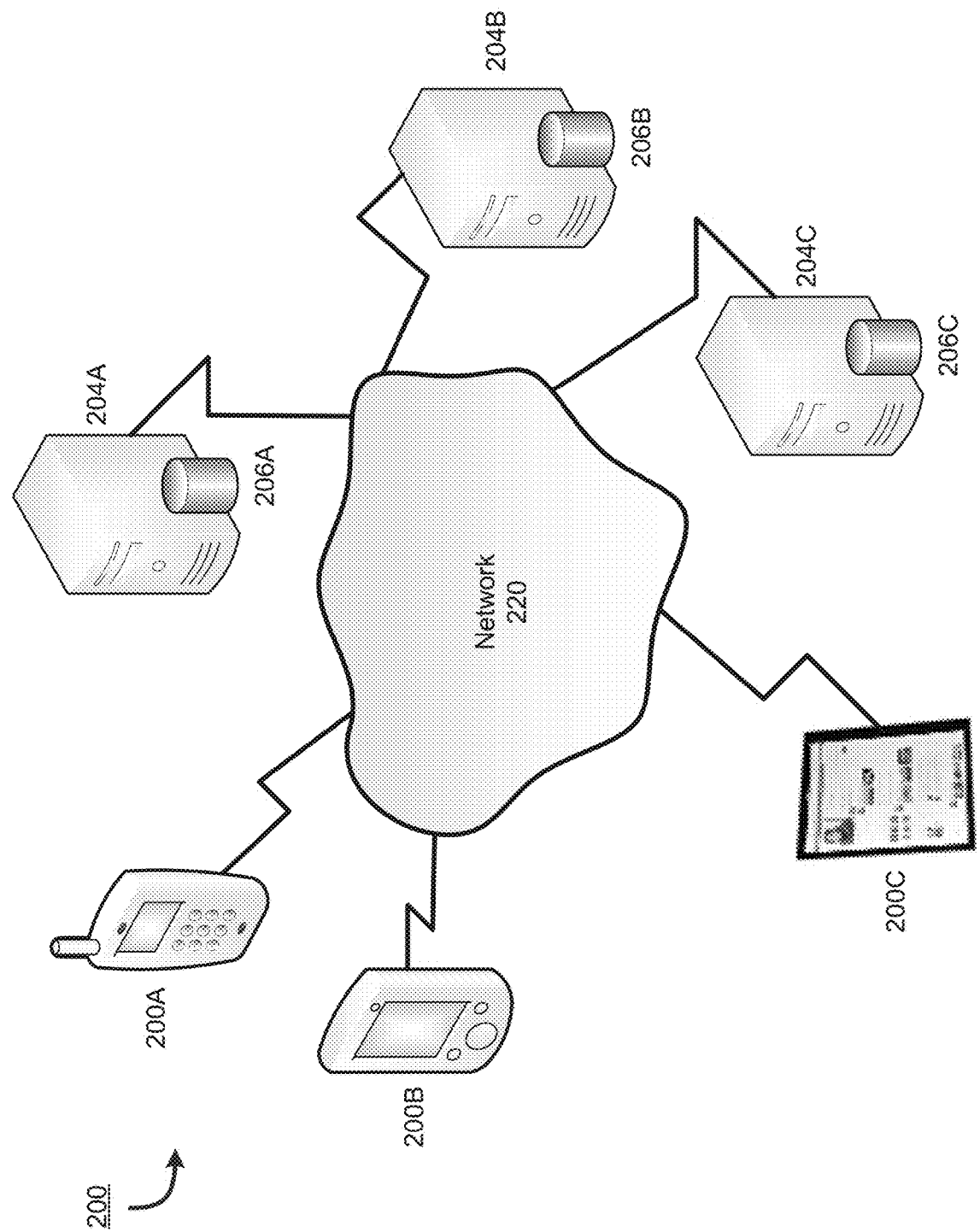
FIGS. 2A-2B illustrate block diagrams of embodiments of the in-vehicle consumer purchase service hosted on a cloud-based provider site.
Figure 2B:
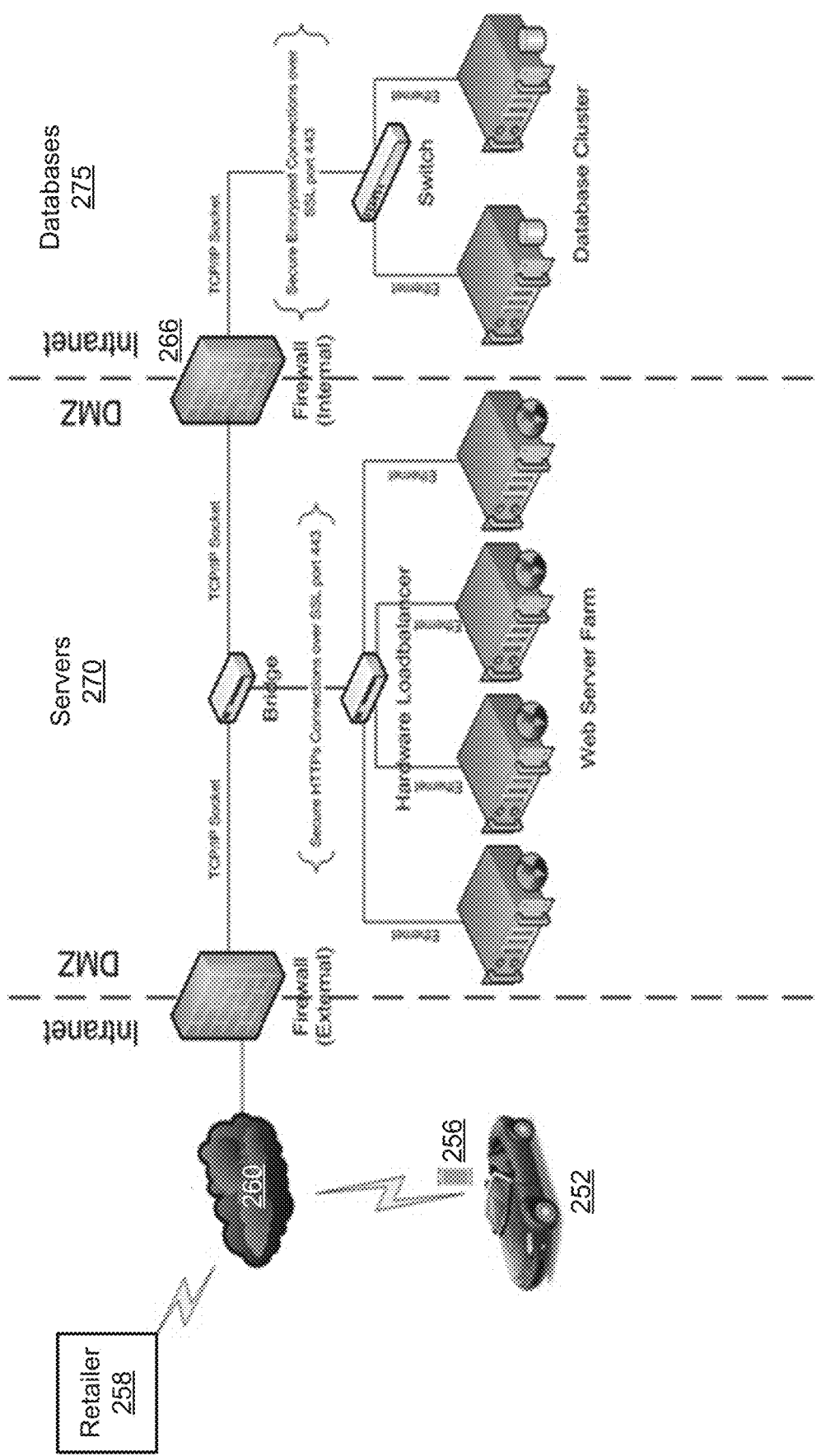

Example processes and apparatuses to provide an automated process workflow for the entire in-vehicle consumer purchase service are described. The following drawings and text describe various example implementations of the design. FIG. 1 and FIGS. 2A-2B illustrate example environments to implement the concepts.

The cloud-based system of in-vehicle consumer purchase can be implemented in software, hardware electronics, and any combination of both and when one or more portions of the system are implemented in software, then that software is tangibly stored in an executable format on the one or more non-transitory storage mediums to be executed by a processing component.

Figure 3:
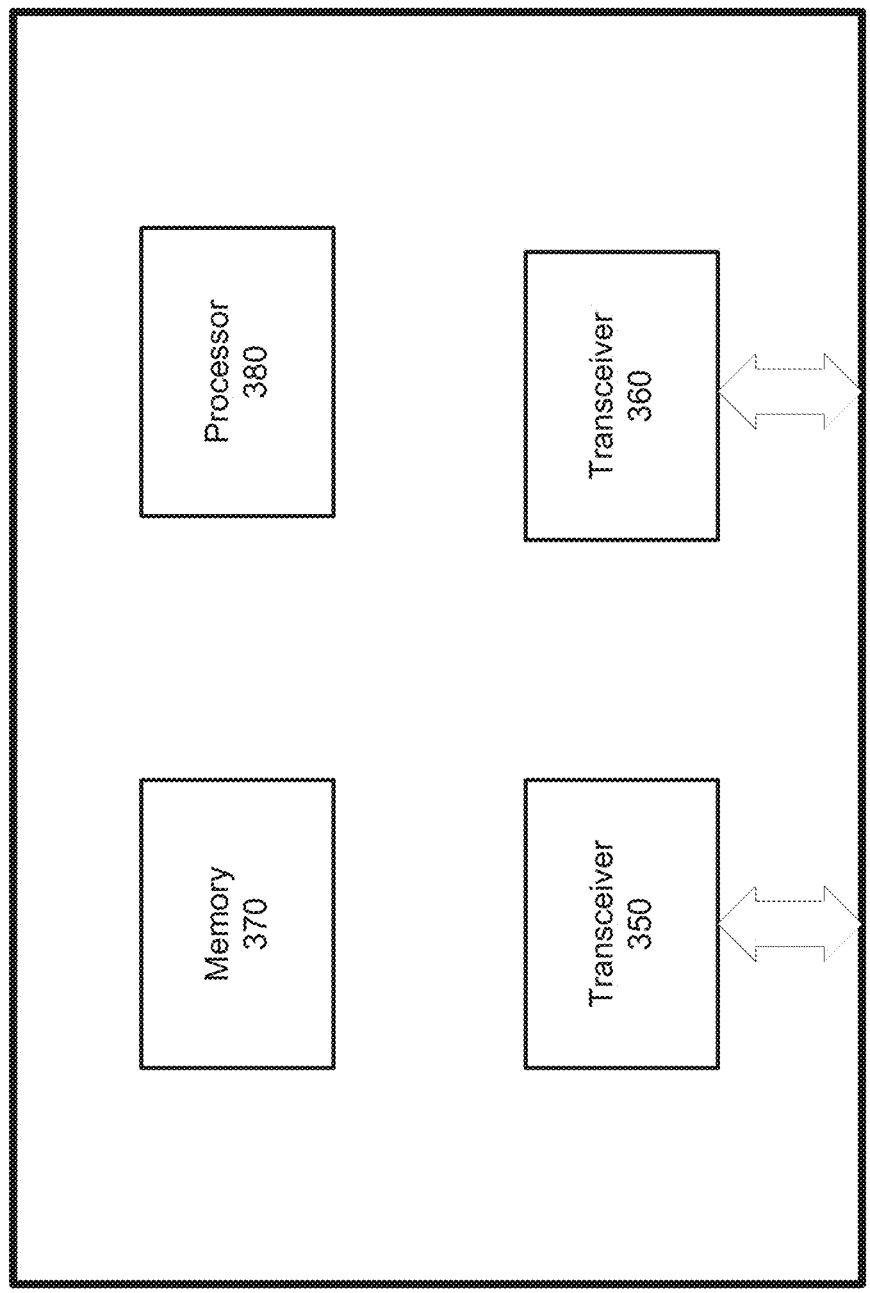
FIG. 3 illustrates a block diagram of the intelligent plugin adapter.

FIG. 3 illustrates a block diagram of the intelligent plugin adapter that includes one or more memory buffers, one or more processors, a first transceiver to communicate, transmit signal and receive signal, with both the second client device installed inside the vehicle and the first client device of a passenger of the vehicle. The intelligent plugin adapter also includes a second transceiver that can communicate, transmit signal and receive signal, with one or more modules on one or more cloud based server. In an embodiment, a vehicle that has two or more passengers, the first transceiver can communicate with two or more client devices of the passengers in addition to the second client device installed inside the vehicle.

Thus, using both the first and the second transceivers of the intelligent plugin adapter, a module on the cloud based servers can communicate and send/receive data to/from the client devices in the vehicle. In an example, the memory buffers of the intelligent plugin adapter can be used as data transfers buffer between the first transceiver and the second transceiver.

In an embodiment, the intelligent plugin adapter installed inside a vehicle includes one or more memory buffers and one or more processors. The intelligent plugin adapter also includes a first transceiver configured to use wireless communications to communicate with one or both of i) a first client device of a consumer inside the vehicle. The intelligent plugin adapter also a second client device installed inside the vehicle. The second transceiver is configured to use wireless communications to communicate with a cloud based backend system outside the vehicle.

Additionally, the intelligent plugin adapter can include a GPS module including a GPS chip that is configured to receive GPS or other such signals and calculate the via GPS or other signals the map coordinates of the vehicle. A first routine running on one of the processors of the intelligent plugin adapter is configured to periodically obtain GPS or map coordinates of the vehicle from the GPS or mapping module of the intelligent plugin adapter.

In an embodiment, the intelligent plugin adapter may not include a GPS or map coordinate module. A first routine running on one of the processors of the intelligent plugin adapter can be configured to periodically request, through the first transceiver, the GPS or map coordinates of the vehicle from the client device of the customer.

The GPS or map coordinates of the vehicle can be stored in one of the memory buffers of the intelligent plugin adapter.

In an embodiment, the cloud based backend system has one or servers and one or more databases. Cellular communication is used between the second transceiver and a control module in the cloud based backend system.

Also, the first transceiver uses Wi-Fi, Bluetooth, Infrared, or other such communications to communicate with the first client device of the customer and the second client device installed inside the vehicle.

In an example, the intelligent plugin adapter can couple to the on-board diagnostic port of the vehicle and/or a USB port in the vehicle.

Additionally, the first transceiver and the second transceiver can cooperate with each other such that the first and second client devices can receive data for Internet browsing, downloading mobile applications, video streaming, and displaying interactive screen from one or more merchant sites. The first and second client devices can also send data from the first and second client devices to the merchant sites and the cloud based backend system.

Figure 4:
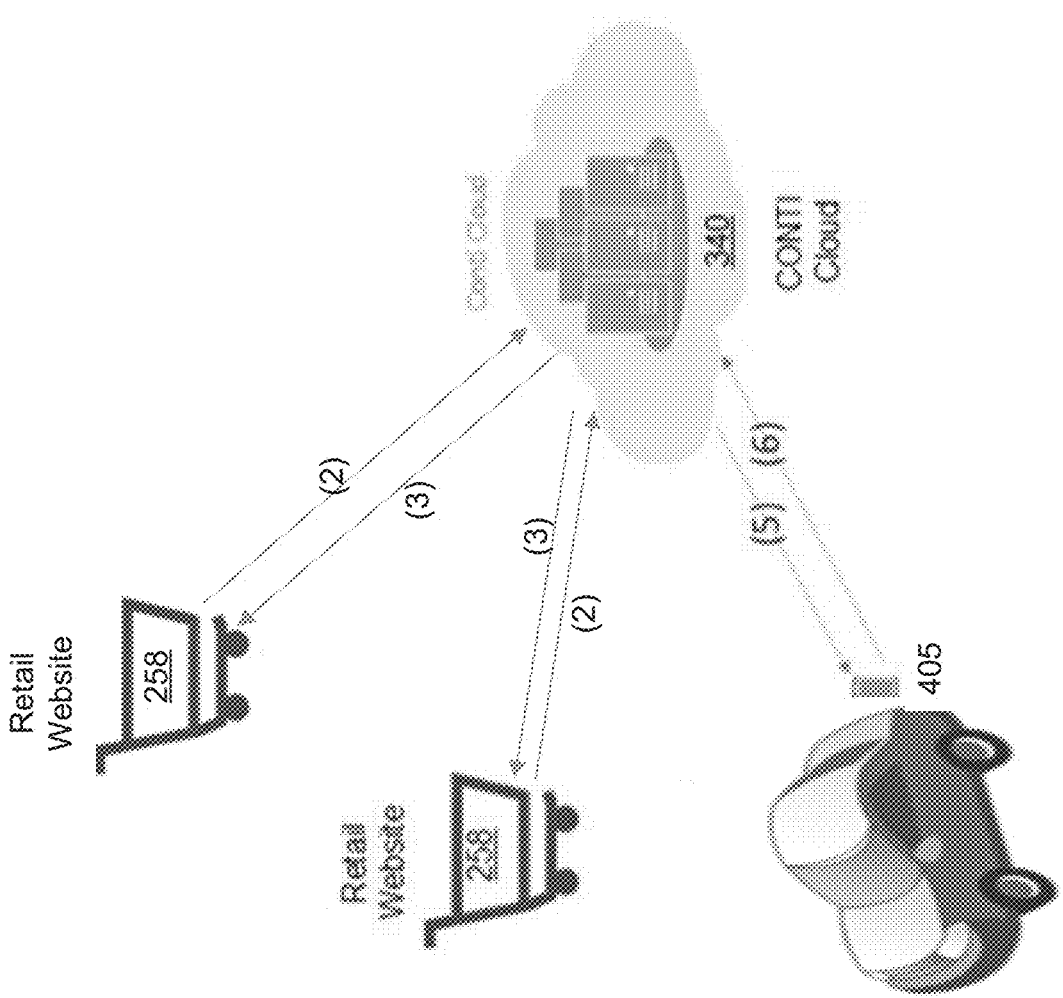
FIG. 4 illustrates a flow diagram of an embodiment of the alternative in-vehicle consumer purchase.

FIG. 4 illustrates a flow diagram of an embodiment of the alternative in-vehicle consumer purchase. The figure shows a dongle (an intelligent plugin adapter) 405 installed in the vehicle to communicate with the backend cloud based servers 340.

(6) The cloud based system for in-vehicle consumer purchase can send information including streaming data to be played/displayed on one or more client devices in the vehicle. The cloud based server communicates through the second transceiver to the dongle 405 and then through the first transceiver to the client devices. The streaming data can include movies, news, interactive games, commercials, menus, etc.

Figure 6:
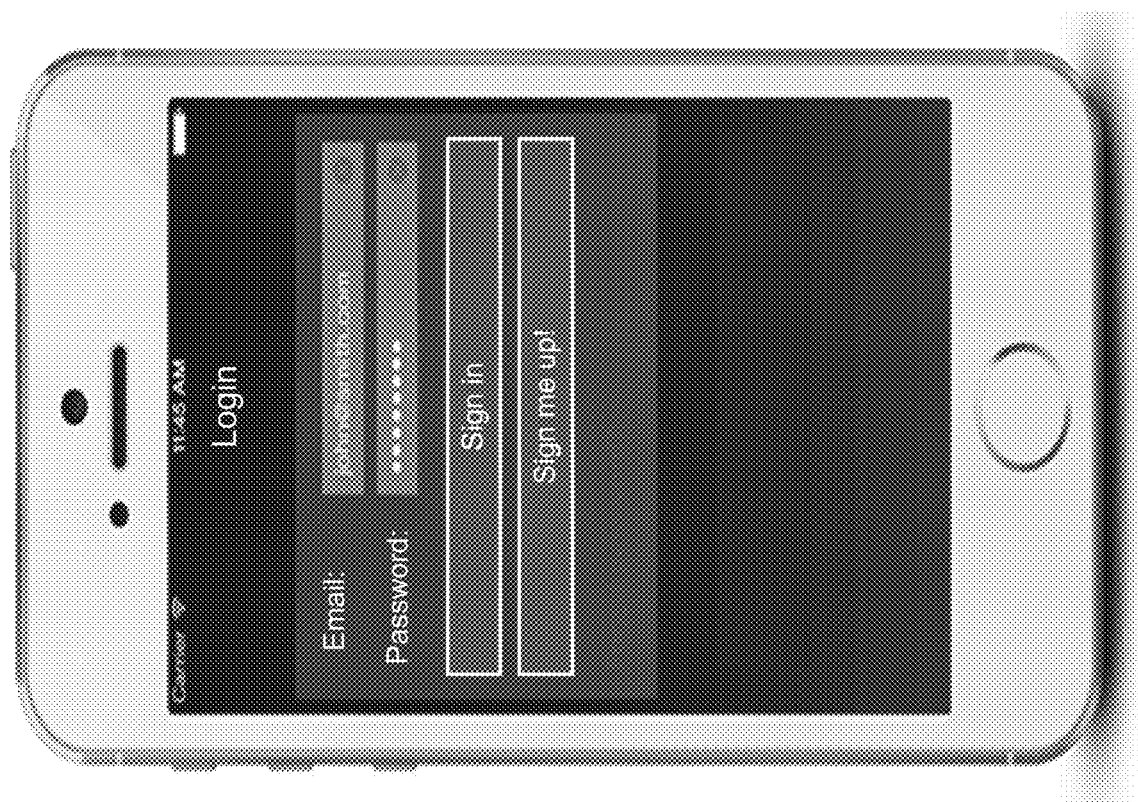
Figure 7:

(5) The client devices inside the vehicle can communicate and send data to the servers of the cloud based servers 340. The data can include log in data (see, for example, FIG. 6) such as username and password to log into a user's account on the cloud based in-vehicle consumer purchase service. In an embodiment, the user/passenger may not have an account and can create an account while travelling to the destination. FIG. 7 shows examples of screen shots on a client device for signing up to the in-vehicle consumer purchase service. As an example, the client devices inside the vehicle can communicate and send data related to selecting an option or placing purchase orders.

In an embodiment, the passenger can create an account simply by swiping a credit or debit card on a reader.

In an embodiment, the passenger's account information has been pre-determined in the cloud based server 340 prior to the passenger entering the vehicle, as by example, the passenger requesting a vehicle pickup while supplying suitable data by telephone or via the internet.

In an embodiment, the passenger's account information may be looked up in server 340 by identity information on the passenger's credit card, debit card, cellular phone, driver's license, or via a scanned digital photograph.

(2) and (3) in an embodiment, the commercials and menus can be interactive such that the user/passenger of the vehicle can select and order one or more of the products or services offered in the commercials and menus. After the user orders, the cloud based servers communicate with the vendors of products or services, including retail stores, restaurants, and internet media companies, through sending the order details (3) and receiving responses (2) such as availability and pick up date and location. In an embodiment, a control module running on the cloud based servers redirects the vehicle to one or more intermediate destination to pick up the order on route to the final destination. In another embodiment, the cloud based server directs other vehicles to pick up the order. The order details can include name and address of the customer as well as monetary data such as a credit account to be charged for the purchase.

In an embodiment, a control module running on one the first group of the processors of the cloud based servers is configured to communicate to the on-board intelligent plugin adapter through one of the ports of the cloud based system to the second transceiver of the on-board intelligent plugin adapter. The on-board intelligent plugin adapter then communicates, through the first transceiver, to one or both of i) the first client device of the consumer in the vehicle, and ii) the second client device inside the vehicle. The control module transmits one or more of movies, commercials for offering products, and interactive games, to be displayed or played on one or both of the first client device and the second client device. As an example, a downloadable application from the servers of the in-vehicle consumer purchase service runs on the clients' devices. Also, the downloadable application can be interactive such that a customer/user can enter data, select options, and place orders, including via menus.

In an embodiment, before displaying the streaming data including the commercials, the consumer can be offered on an interactive user interface the terms and conditions of the in-vehicle consumer purchase service. The streaming data can be displayed after accepting the terms and conditions.

In an embodiment, the customer takes advantage of the available time during the ride within a vehicle to choose and purchase zero or more items based on the offered products on the first client device or the second client device in the vehicle. In an example, the ride can include a "hailed ride", a taxi ride, a ride in consumer's own vehicle, a shared ride, a free transportation, or a paid transportation.

In an embodiment, before riding the vehicle, a registered user of the cloud based system is configured to log in, through the first client device and via a cellular communication to the user's account on the cloud based system. The user then sends a trip request from an origin to the destination. The registered user's account is tied to a credit account of the registered user for charging the costs of the trip. The control module of the cloud based system sends a security token to the first client device of the customer. After the customer becomes a passenger of the vehicle, the security token is configured to cause the client device of the customer to remain logged in to the user's account via the second transceiver of the on-board intelligent plugin of the vehicle. In an alternative embodiment, the initial cloud based login is via a computer on the internet, or via a different device belonging to the registered user.

In an embodiment, a Global Positioning System (GPS) based proximity module runs on the first group of one or more processors of the cloud based servers. The GPS-based proximity module is configured to receive, via a cellular communication, current GPS coordinates of the vehicle from the second transceiver of the intelligent plugin adapter. The GPS-based proximity module is configured to calculate a distance between the vehicle and zero or more intermediate target locations. The intermediate target locations are pickup locations corresponding to the purchased items. The control module of the cloud based system is configured to add monetary charges to the credit account of the user, in addition to a trip fair to the destination, for the cost of purchased items and extra travelled distances to pick up the purchased items. As an example, the control module redirects the vehicle to the intermediate locations to pick up purchased items.

In an embodiment, a compensation module in one of the servers associated with the cloud based system calculates financial transactions between a provider of the vehicle transportation and the cloud based system. The financial transactions are based on a series of fee agreements that are one or combinations of i) a revenue share agreement, ii) a license agreement for unlimited use, or iii) such other agreement.

In an embodiment, the intelligent plugin adapter can be bypassed and a client device of the consumer can communicate via cellular communication to the cloud based server of in-vehicle consumer purchase service. The client device of the consumer can be a mobile device, a laptop, a tablet, head mounted receiver/display, etc. As an example the consumer can be a passenger or a driver of the vehicle during the period before and after the entry or exit into the vehicle. In an example, during the ride, the customer through the customer's client device can communicate to the cloud based server to send and receive data for Internet browsing, downloading mobile applications, video streaming, interactive games, commercial advertisements both interactive and non-interactive, and displaying interactive menus for selection from one or more merchant sites, and makes purchases of products and services.

The client device display can be any permanently installed or removable computer display system comprised of screen of LCD, LED, CRT, glasses mounted, retinal projection, window project or other such methods of displaying computer graphics for viewing by the consumer/user. The display can optionally have a speaker, microphone, or headset. The display can be the display on a portable electronic device including a custom build electronic device for this purpose, a smart phone display, a portable laptop or netbook computer, tablet, or other such similar device. In an example, one or more menus of goods and services for purchase can be displayed. As an example, the received data may only be audio.

In an embodiment, goods or services includes digital media including video with audio, video only, audio only, games, or information services. Also, includes the consumption or provision of the goods and/or services in the vehicle, at one or more intermediate stops, or at the destination of the trip.

The purchased items can include any in-vehicle or after vehicle consumption of goods or services purchased in the vehicle or in the period between when the consumer has initiated the request for pickup by vehicle. Also included is any advertisements displayed by the client display device of the consumer during these periods.

Additionally, the displaying include of non-episodic or episode or on-going sequential scenes of movies, news, or shorts on the screen that can optionally be sequenced based upon getting the consumer ID as contained in their credit, debit, or server based ID in the example of a centralized account method so that the customer would be induced to purchase multiple rides with vehicles equipped using the option, or would be induced to purchase the remainder of the episodic content on the personal or home video display devices subsequent to their exit of the vehicle.

In an embodiment, the display of interactive games, which may or may not be exclusive, and may or may not sequential based upon the game state of the prior ride as based on the consumer login information, with optionally the ability to purchasing continuing play subsequent to the conclusion of the trip on the consumer's personal or home computer, tablet, telephone or other such similar equipment.

In an embodiment, the cloud based system can have a statistics module in a cloud based server to store the preferences of the consumer for menu purchases of goods and services, time of day, and location, and based upon the consumer's login ID.

In an embodiment the communications between the cloud based servers and the intelligent plugin adapter, or between the intelligent plugin adapter and the client devices can be a digital communication. The communications can use any wavelength including radio, microwave, infrared, visible, ultraviolet, X-rays, or gamma rays, and may include a direct cable connection.

Revenue

Figure 5:
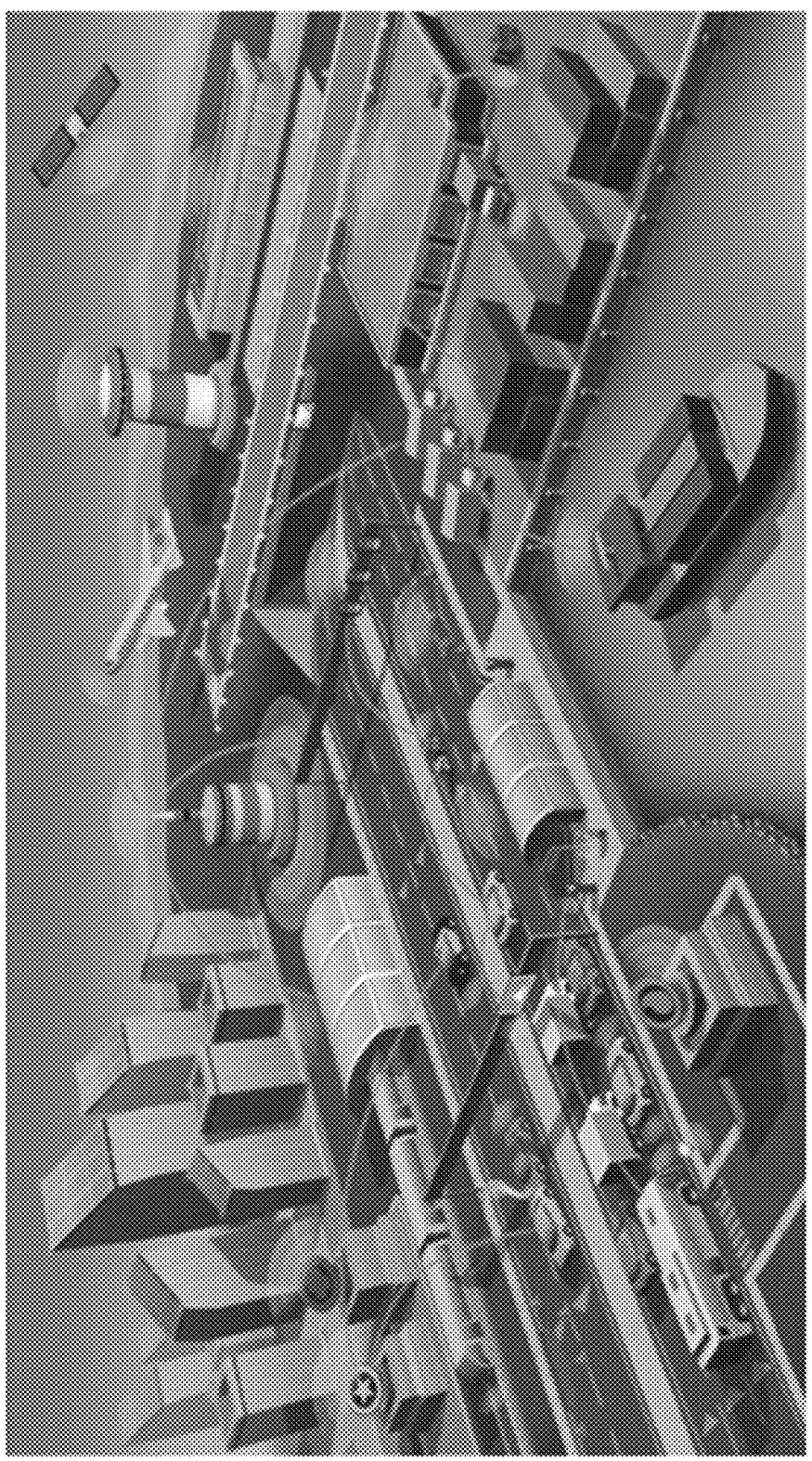
FIG. 5 illustrates a block diagram of Intelligent Transportation System.

FIG. 5 illustrates a block diagram of an embodiment of the alternative in-vehicle consumer purchase. As discussed, the user/customer may pay an additional fee on a per pick-up instance to use the in-vehicle purchase service. The user/customer may pay a monthly or yearly subscription fee for all pick-up activities related to in-vehicle consumer purchase service. The user/customer may pay on another usage case model. A revenue sharing agreement may be in place between the retailers, the cloud based in-vehicle consumer purchase service provider, and the local transportation service providers. Advertisers may also subsidize the extra cost of multiple stops for order pick up to encourage in-vehicle consumer purchase. Combinations of the above may be used in the revenue generating processes for using the in-vehicle consumer purchase service. The backend servers of the in-vehicle consumer purchase service provider, the local transportation service providers, and retailer sites collect and distribute the compensation.

In an embodiment, the cloud based in-vehicle consumer purchase service provider can establish revenue sharing agreement with the local transportation service providers.

As an example, payment for the goods and services can be made by any of these methods: pre-entered financial credentials at the time of the request for pickup, credit/debit card swipe, manually entered or orally entered credit/debit/ACH information, cash, voucher, or computer credit.

In an embodiment, advertisement revenue; 2) the purchase/rental revenue, and/or 3) discounts; arrangement from the vendors or advertisers to the consumer could be allocated in any percentage (including zero and 100%) for any of the below in this list: consumer, driver, transportation provider, vendor, advertiser.

Computing System

FIG. 1 illustrates a block diagram of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine readable media. Computing machine readable media can be any available media that can be accessed by computing system 810 and includes both volatile and nonvolatile media, removable and non-removable media. By way of example, and not limitation, computing machine readable mediums uses include storage of information, such as computer readable instructions, data structures, other software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 1 illustrates operating system 834, other software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1, provide storage of computer readable instructions, data structures, other software and other data for the computing system 810. In FIG. 1, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port, bluetooth, infrared port, or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, in vehicle DC power input, potentially a built-in video camera, a display screen, a built-in Wi-Fi or Bluetooth circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The DC power supply may be the vehicles power supply bus including its alternator, generator, photovoltaic cells, fuel cell or other such similar power sources as provided by the vehicle. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, a tablet computer, or other similar device with on board processing power and wireless communications ability that is powered by a Direct Current (DC) power source that supplies DC voltage to the mobile device and that is solely within the mobile computing device and may need to be recharged on a periodic basis, such as a fuel cell or a battery.

Network Environment

FIG. 2A illustrates diagrams of a network environment in which the techniques described may be applied. The network environment 200 has a communications network 220 that connects server computing systems 204A through 204C, and at least one or more client computing systems 200A to 200C. As shown, there may be many server computing systems 204A through 204C and many client computing systems 200A through 200C connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 200A and the server computing system 204A can both initiate and respond to communications, their communication may be viewed as peer-to-peer. Likewise, communications between the client computing systems 200A and 200B, and the server computing systems 204A and 204B may be viewed as peer-to-peer if each such communicating device is capable of initiation and response to communication. Additionally, server computing systems 204A-204C also have circuitry and software to communication with each other across the network 220. One or more of the server computing systems 204A to 204C may be associated with a database such as, for example, the databases 206A to 206C. Each server may have one or more instances of a virtual server running on that physical server and multiple virtual instances may be implemented by the design. A firewall may be established between a client computing system 200A and the network 220 to protect data integrity on the client computing system 200A. Each server computing system 204A-204C may have one or more firewalls.

FIG. 2B illustrates a block diagram of an embodiment of a cloud-based in-vehicle consumer purchase service hosted on the cloud-based provider. The cloud-based in-vehicle consumer purchase service is hosted on a cloud-based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud based site is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

In an embodiment, the server computing system 204A may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

In an embodiment of a server computing system is used to display information, such as a web page, etc. An application including any program modules, when executed on the server computing system 204A, causes the server computing system 204A to display windows and user interface screens on a portion of a media space, such as a web page. A user via a browser from the client computing system 200A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 200A or any equivalent thereof. For example, the client mobile computing system 200A may be a smart phone, a touch pad, a laptop, a netbook, etc. The client computing system 200A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 200A. The applications then serve pages that allow entry of details and further pages that allow entry of more details.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based in-vehicle consumer purchase service are configured to collect and provide features such as those described herein.

Any application and other scripted code components may be stored on a non-transitory computing machine readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, software includes routines, programs, objects, widgets, plug-ins, and other similar structures that perform particular tasks or implement particular abstract data types. Those skilled in the art can implement the description and/or figures herein as computer-executable instructions, which can be embodied on any form of computing machine readable media discussed herein.

In one embodiment, the software used to facilitate the algorithms discussed herein can be embodied onto a non-transitory machine-readable medium. A machine-readable medium includes any mechanism that stores information in a form readable by a machine (e.g., a computer). For example, a non-transitory machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components may be duplicated by software emulation. Thus, a software program written to accomplish those same functions may emulate the functionality of the hardware components in input-output circuitry. The design is to be understood as not limited by the specific embodiments described herein, but only by scope of the appended claims.

What is claimed is:

1. An intelligent plugin adapter installed inside a vehicle, the intelligent plugin adapter comprising:
   one or more memory buffers;
   one or more processors;
   a first transceiver configured to use wireless communications to communicate with one or both of i) a first client device of a consumer inside the vehicle, and ii) a second client device installed inside the vehicle;
   a second transceiver configured to use wireless communications to communicate with a cloud based backend system outside the vehicle;
   wherein the first transceiver and the second transceiver are configured to cooperate with each other such that the first and second client devices receive data for Internet browsing, downloading mobile applications, video streaming, and displaying one or more interactive screens from one or more merchant sites, and to send data from the first and second client devices to the one or more merchant sites and the cloud based backend system.

2. The installed intelligent plugin adapter of claim 1, wherein a first routine running on one of the processors is configured to either i) periodically obtain GPS or other map coordinates of the vehicle from a GPS or other map locating module, in the intelligent plugin adapter, where the GPS or other map locating module is configured to receive GPS or other map locating signals and calculate the GPS or other map locating coordinated of the vehicle, or ii) periodically request, through the first transceiver, the GPS or other map locating coordinates of the vehicle from the client device of the customer, where the GPS or other map locating coordinates are configured to be stored in one of the memory buffers.

3. The installed intelligent plugin adapter of claim 1, wherein the cloud based backend system has one or servers and one or more databases, wherein cellular communication is used between the second transceiver and a control module in the cloud based backend system.

4. The installed intelligent plugin adapter of claim 1, wherein the first transceiver uses Wi-Fi, Bluetooth, other radio frequency, infrared, optical, fiber-optic, or directly wired communications to communicate with the first client device of the customer and the second client device installed inside the vehicle.

5. A cloud based system for consumer purchase while riding in a vehicle to a destination, the cloud based system comprising:
   one or more cloud based servers having a first group of one or more processors and one or more ports, and configured to cooperate with one or more databases in the cloud based system;
   wherein the vehicle has an on-board intelligent plugin adapter that includes one or more memory buffers,
   a second group of one or more processors, a first transceiver configured to use wireless communications to communicate with one or both of i) a first client device of a consumer in the vehicle, and ii) a second client device installed inside the vehicle, and a second transceiver configured to use wireless communications to communicate with the cloud based servers of the cloud based system;

wherein a control module running on one the first group of the processors of the cloud based system is configured to communicate through one of the ports of the cloud based system to the second transceiver of the on-board intelligent plugin adapter and then communicate, through the first transceiver, to one or both of i) the first client device of the consumer in the vehicle, and ii) the second client device inside the vehicle, where the control module then transmits data for Internet browsing, downloading mobile applications, video streaming, interactive games, and displaying one or more interactive commercials from one or more merchant sites, to be displayed on one or both of the first client device and the second client device; and wherein the control module is configured to enable the consumer to choose and purchase zero or more items based on products offered in the displayed interactive commercials.

6. The cloud based system of claim 5, wherein before riding the vehicle a registered user of the cloud based system is configured to log in, through the first client device and via cellular communication, to the registered user's account on the cloud based system and send a trip request from an origin to the destination, where the registered user's account is tied to a credit account of the registered user for charging the costs of the trip, wherein the control module of the cloud based system sends a security token to the first client device of the consumer such that after the consumer rides the vehicle the security token is configured to cause the consumer to remain logged in to the user's account via the second transceiver of the on-board intelligent plugin of the vehicle.

7. The cloud based system of claim 6, wherein a first routine running on one of the processors of the second group of processors of the on-board intelligent plugin is configured to either i) periodically obtain GPS or other map coordinates of the vehicle from a GPS or other map locating module, in the intelligent plugin adapter, wherein the GPS or other map locating module is configured to receive GPS or other map locating signals and calculate the GPS or other map locating coordinates of the vehicle, or ii) periodically request, through the first transceiver, the GPS or other map locating coordinates of the vehicle from the client device of the consumer, wherein the GPS or other map locating coordinates are configured to be stored in one of the memory buffers of the intelligent plugin adapter.

8. The cloud based system of claim 7, further including a Global Positioning System (GPS) or other map locating based proximity module running on the first group of one or more processors of the cloud based system, where the GPS or other map locating based proximity module is configured to receive via a cellular communication current GPS or other map locating coordinates of the vehicle from the second transceiver of the intelligent plugin adapter and calculate a distance or distances between the vehicle and one or more intermediate target locations, wherein the intermediate target locations are pickup locations corresponding to the purchased items, where the control module of the cloud based system is configured to add monetary charges to the credit account of the registered user, in addition to a trip fare to the destination, for a cost of purchased items and extra travelled distances to pick up the purchased items.

9. The cloud based system of claim 8, wherein the first transceiver and the second transceiver are combined and implemented as a unified transceiver.

10. The cloud based system of claim 7, further including a compensation module in one of the servers associated with the cloud based system calculates financial transactions between an owner of the vehicle, a driver of the vehicle, an owner of a ride hailing service, and the cloud based system, where the financial transactions are based on a series of fee agreements that are one or combinations of i) a revenue share agreement, ii) a license agreement for unlimited use.

* * * * *